United States Patent
Adi et al.

(10) Patent No.: US 11,656,938 B2
(45) Date of Patent: May 23, 2023

(54) PREEMPTIVE READ VERIFICATION AFTER HARDWARE WRITE BACK

(71) Applicant: Micron Technology, Inc., Boise, ID (US)

(72) Inventors: Frederick Adi, Castro Valley, CA (US); Zhenlei Shen, Milpitas, CA (US); Wei Wang, Dublin, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/445,345

(22) Filed: Aug. 18, 2021

(65) Prior Publication Data

US 2022/0100605 A1 Mar. 31, 2022

Related U.S. Application Data

(60) Provisional application No. 63/198,087, filed on Sep. 28, 2020.

(51) Int. Cl.
| | |
|---|---|
| *G06F 11/00* | (2006.01) |
| *G06F 11/10* | (2006.01) |
| *G06F 11/07* | (2006.01) |
| *G06F 3/06* | (2006.01) |

(52) U.S. Cl.
CPC ........ *G06F 11/1068* (2013.01); *G06F 3/0619* (2013.01); *G06F 3/0659* (2013.01); *G06F 3/0679* (2013.01); *G06F 11/076* (2013.01)

(58) Field of Classification Search
None
See application file for complete search history.

(56) References Cited

U.S. PATENT DOCUMENTS

| | | | | |
|---|---|---|---|---|
| 6,898,036 | B2 * | 5/2005 | Gill | G11B 5/584 |
| 8,412,987 | B2 * | 4/2013 | Billing | G11C 16/349 |
| | | | | 714/710 |
| 11,232,848 | B2 * | 1/2022 | Bacchus | G11C 29/42 |
| 2007/0094569 | A1 * | 4/2007 | Thayer | G06F 11/106 |
| | | | | 714/763 |
| 2010/0169729 | A1 * | 7/2010 | Datta | G11C 29/50 |
| | | | | 713/1 |

(Continued)

OTHER PUBLICATIONS

Authors et al., "A Method for Recovering From Errors in Flash Memory", Oct. 15, 2006, IP.com, IPCOM000141800D, (32 pages) (Year: 2006).*

(Continued)

*Primary Examiner* — Daniel F. McMahon
(74) *Attorney, Agent, or Firm* — Lowenstein Sandler LLP

(57) ABSTRACT

A processing device in a memory sub-system receives an indication that a write back operation was performed for a management unit in a memory device. Responsive to receiving the indication that the write back operation was performed, the processing device initiates a read verify operation for the management unit and receives an indication of a number of write back errors associated with the management unit during the read verify operation. The processing device further determines whether the number of write back errors satisfies a read verify threshold criterion, and responsive to the number of write back errors satisfying the read verify threshold criterion, remaps the management unit to a different location on the memory device.

20 Claims, 5 Drawing Sheets

(56) References Cited

U.S. PATENT DOCUMENTS

| | | | | |
|---|---|---|---|---|
| 2010/0332900 A1* | 12/2010 | Yang | .................. | G06F 11/1096 |
| | | | | 711/E12.007 |
| 2014/0219034 A1* | 8/2014 | Gomez | .................. | G11C 11/16 |
| | | | | 365/185.22 |
| 2016/0188429 A1* | 6/2016 | Noguchi | ................. | G06F 12/16 |
| | | | | 714/6.21 |
| 2018/0276124 A1* | 9/2018 | Chen | ................... | G06F 12/0638 |
| 2020/0089567 A1* | 3/2020 | Takeda | ................ | G06F 11/1048 |
| 2021/0208965 A1* | 7/2021 | Cha | ....................... | G11C 11/406 |

OTHER PUBLICATIONS

D. Roberts, T. Kgil and T. Mudge, "Using non-volatile memory to save energy in servers," 2009 Design, Automation & Test in Europe Conference & Exhibition, 2009, pp. 743-748, doi: 10.1109/DATE. 2009.5090763. (Year: 2009).*

* cited by examiner

PREEMPTIVE READ VERIFICATION AFTER HARDWARE WRITE BACK

RELATED APPLICATIONS

This application claims priority to U.S. Provisional Patent Application No. 63/198,087, filed Sep. 28, 2020, the entire contents of which are hereby incorporated by reference herein.

TECHNICAL FIELD

Embodiments of the disclosure relate generally to memory sub-systems, and more specifically, relate to preemptive read verification after hardware write back to a memory device in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
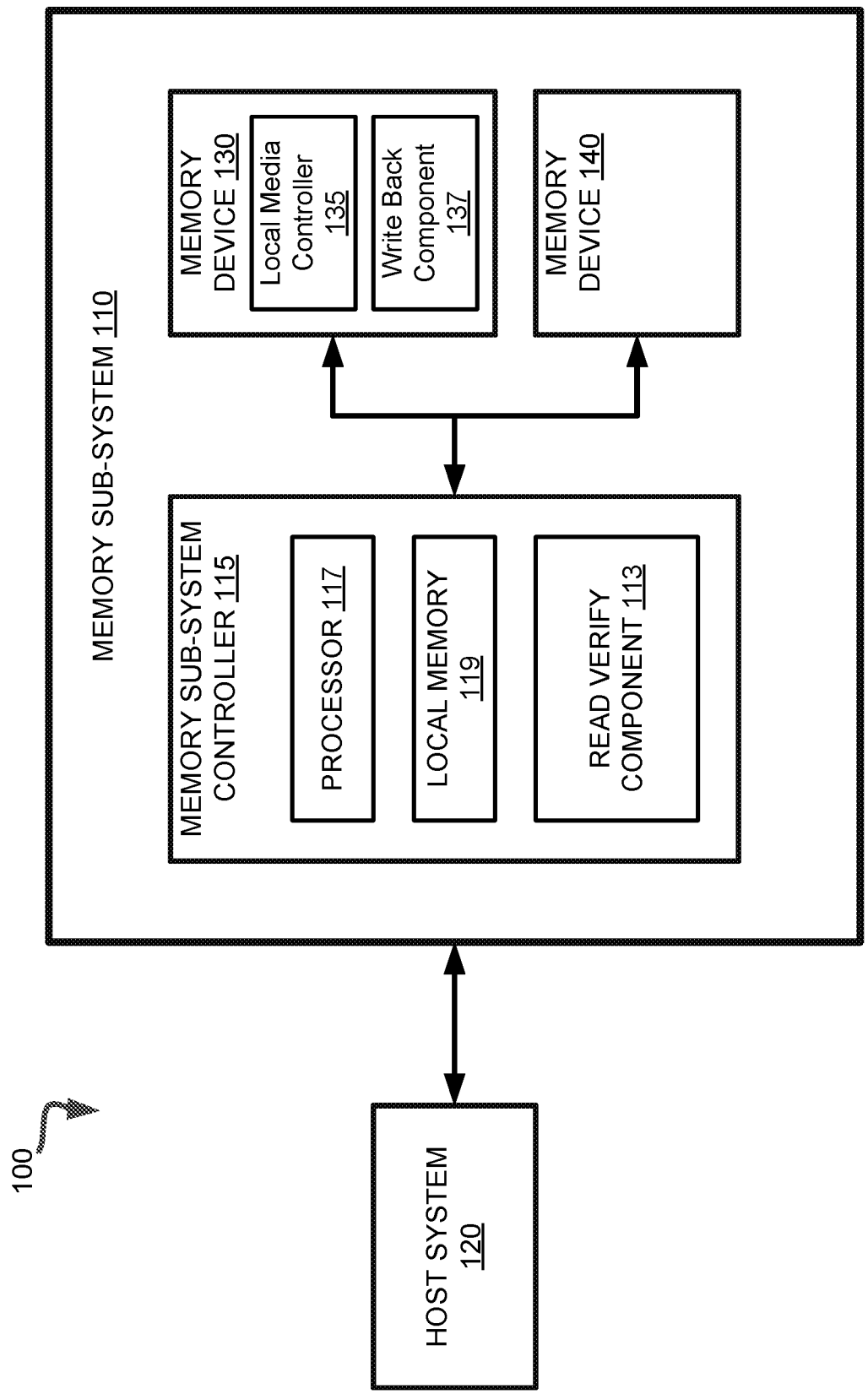
FIG. 1 illustrates an example computing system that includes a memory sub-system in accordance with some embodiments of the present disclosure.

Aspects of the present disclosure are directed to preemptive read verification after hardware write back to a memory device in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a three-dimensional cross-point ("3D cross-point") memory device that is a cross-point array of non-volatile memory that can perform bit storage based on a change of bulk resistance, in conjunction with a stackable cross-gridded data access array. Another example of a non-volatile memory device is a negative-and (NAND) memory device. Other examples of non-volatile memory devices are described below in conjunction with FIG. 1. Each of the memory device can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values. For example, a single level cell (SLC) can store one bit of information and has two logic states. The memory sub-system includes a memory sub-system controller that can communicate with the memory devices to perform operations such as reading data, writing data, or erasing data at the memory devices and other such operations. A memory sub-system controller is described in greater below in conjunction with FIG. 1.

The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. The metadata and host data, together, is hereinafter referred to as "payload." Metadata, host data, and parity data, which is used for error correction, can collectively form an error correction code (ECC) codeword. Metadata can also include data version (e.g. used to distinguish age of data written), valid bitmap (which LBAs or logical transfer units contain valid data), etc.

When performing memory access operations, such as read operations (e.g., in response to a received memory access request/command), certain memory sub-systems take action to correct any errors present in the data being read. For example, upon reading data from a memory device in response to a request, the memory sub-system controller can perform an error detection and correction operation. The error detection and correction operation includes identifying a number of errors (e.g., bit flip errors) or an error rate in the read data. The memory sub-system can have the ability to correct a certain number of errors (e.g., using error correction code (ECC)). As long as the number of errors in the data are less than the ECC capability of the memory sub-system, the errors can be corrected before the data is provided to the requestor (e.g., the host system). In an attempt to prevent those same errors from being present when a subsequent memory access operation is performed on the same management unit (or super management unit), the memory sub-system can perform a write back operation. In a write back operation, the data from the management unit is overwritten with the corrected data that was just read from the memory device. Thus, any errors that were present in the data when it was read will be corrected so that those errors are not present going forward. However, certain memory sub-systems lack any feedback mechanism to ensure that no errors are introduced to the data during the write back operation. Furthermore, there is no way to determine if there is degradation at the physical location on the storage media where the management unit is location, which could cause additional errors in the data stored there in the future.

Aspects of the present disclosure address the above and other deficiencies by performing preemptive read verification after hardware write back to a memory device in a memory sub-system. In one embodiment, the memory sub-system controller receives a notification that a hardware component on the memory device has performed a write back operation. In one embodiment, that hardware component determines a number of errors in data read from a management unit of the memory device and, if the number of errors satisfies a write back threshold criterion (e.g., meets or exceeds a write back threshold number), performs a write back operation. In the write back operation, the errors in the read data are corrected (e.g., using error detection and correction operation) and the corrected data is written back to the same management unit of the memory device (i.e., overwriting the data that was previously read). Responsive to receiving the notification of the write back operation, the memory sub-system controller determines whether a read verify operation is already pending for the management unit (e.g., whether the management unit is found in a queue of pending read verify operations), and if not, schedules a read verify operation (e.g., adds an indication of the management unit to the queue). The memory sub-system controller subsequently performs the read verify operation by initiating a read of the write back data by the hardware component on the memory device. In one embodiment, the hardware component performs the read, determines a number of errors in the write back data read from the management unit of the memory device, and notifies the memory sub-system controller of the same. The memory sub-system controller can determine whether the number of errors satisfies a read verify threshold criterion (e.g., meets or exceeds a read verify threshold number, which can be lower than the write back threshold number), and if so, initiates a remapping of the management unit to a different physical location on the memory device.

Advantages of this approach include, but are not limited to a verification that the write back operation was successful. By re-reading the write back data, the memory sub-system is able to verify that valid data was written the memory device and that errors were not introduced during the write back operation. In addition, the memory sub-system can verify whether the physical location where the write back operation was performed is viable for future program and read operations. As the physical media can degrade over time, the errors detected during the write back operation can be attributable to the media itself. If those same errors are detected during the read verify operation, the memory sub-system can confirm that the media is degraded. If the media were not degraded, the errors found during the read verify operation would be much less than those found during the write back operation.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In one embodiment, the memory sub-system 110 includes a read verify component 113 that performs preemptive read verification after a hardware write back operation on memory device 130. In some embodiments, the memory sub-system controller 115 includes at least a portion of power management component 113. For example, the memory sub-system controller 115 can include a processor 117 (e.g., a processing device) configured to execute instructions stored in local memory 119 for performing the operations described herein. In other embodiments, read verify component 113 is part of memory sub-system 110, but is separate from memory sub-system controller 115. In other embodiments, local media controller 135 includes at least a portion of read verify component 113 and is configured to perform the functionality described herein.

In one embodiment, memory device 130 includes write back component 137, which can be implemented as a hardware circuit. In one embodiment, when a read operation is performed on memory device 130, the write back component 137 determines a number of errors in data read from a management unit of the memory device 130 and determines whether the number of errors satisfies a write back threshold criterion. If the number of errors satisfies a write back threshold criterion (e.g., meets or exceeds a write back threshold number), write back component performs a write back operation. In the write back operation, the errors in the read data are corrected and then written back to the same management unit of the memory device 130 (i.e., overwriting the data that was previously read). When write back component 137 performs a write back operation, memory sub-system controller 115 receives a notification (e.g. a media controller event notification). Responsive to receiving the notification of the write back operation, read verify component 113 can perform a read verify operation, as described in more detail below.

Figure 2:
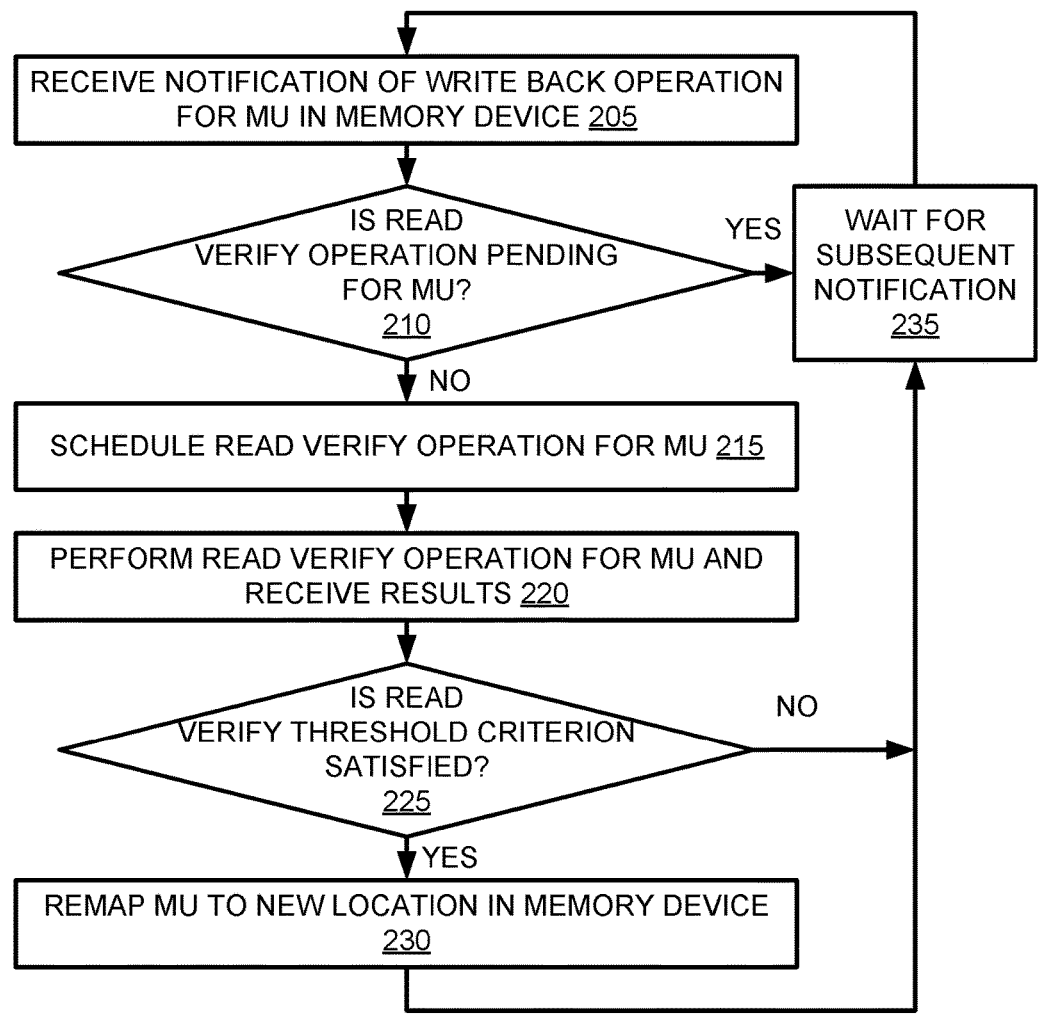
FIG. 2 is a flow diagram of an example method of preemptive read verification after hardware write back to a memory device in a memory sub-system in accordance with some embodiments of the present disclosure.

FIG. 2 is a flow diagram of an example method of preemptive read verification after hardware write back to a memory device in a memory sub-system. in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by read verify component 113 and memory sub-system controller 115 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing logic receives notification of a write back operation. In one embodiment, read verify component 113 receives the notification from write back component 137 of memory device 130. The notification indicates that write back component 137 has performed a write back operation where data (e.g., a management unit or super management unit) read from the memory device 130 undergoes an error correction process and is written back to the same location of the memory device, thereby overwriting the original data at that location.

At operation 210, the processing logic determines whether a read verify operation is already pending for the management unit. In one embodiment, read verify component 113 determines whether the management unit is found in a queue of pending read verify operations. The queue (or other data structure) can include indications of a fixed number of management units having the most recently scheduled read verify operations. As additional read verify operations are scheduled, the longest pending read verify operations can be removed from the queue. In one embodiment, read verify component 113 maintains the queue in local memory 119 of memory sub-system controller 115. In another embodiment, the queue is maintained on memory device 130 or memory device 140 in memory sub-system 110. Additionally, if a read verify operation has been pending for a certain threshold period of time, the indication of the corresponding management unit can be removed from the queue. In one embodiment, read verify component 113 compares an indication of the management unit for which a write back operation was performed to those management units in the queue to determine if a read verify operation is already pending for that management unit.

If a read verify operation is not already pending, at operation 215, the processing logic schedules a read verify operation for the management unit. In one embodiment, read verify component 113 adds an indication of the management unit to the queue.

At operation 220, the processing logic subsequently performs the read verify operation by initiating a read of the write back data by the write back component 137 on the memory device 130. In one embodiment, read verify component 113 performs the read verify operations on the management units indicated in the queue in the order in which they were place in the queue and during times when memory sub-system controller 115 is not otherwise busy performing other memory access operations. In one embodiment, the hardware write back component 137 performs the read, determines a number of errors in the write back data read from the management unit of the memory device 130, and notifies the memory sub-system controller 115 of the same. In one embodiment, read verify component 113 receives the results of the read verify operation including the number of errors identified in the write back data.

Figure 3:
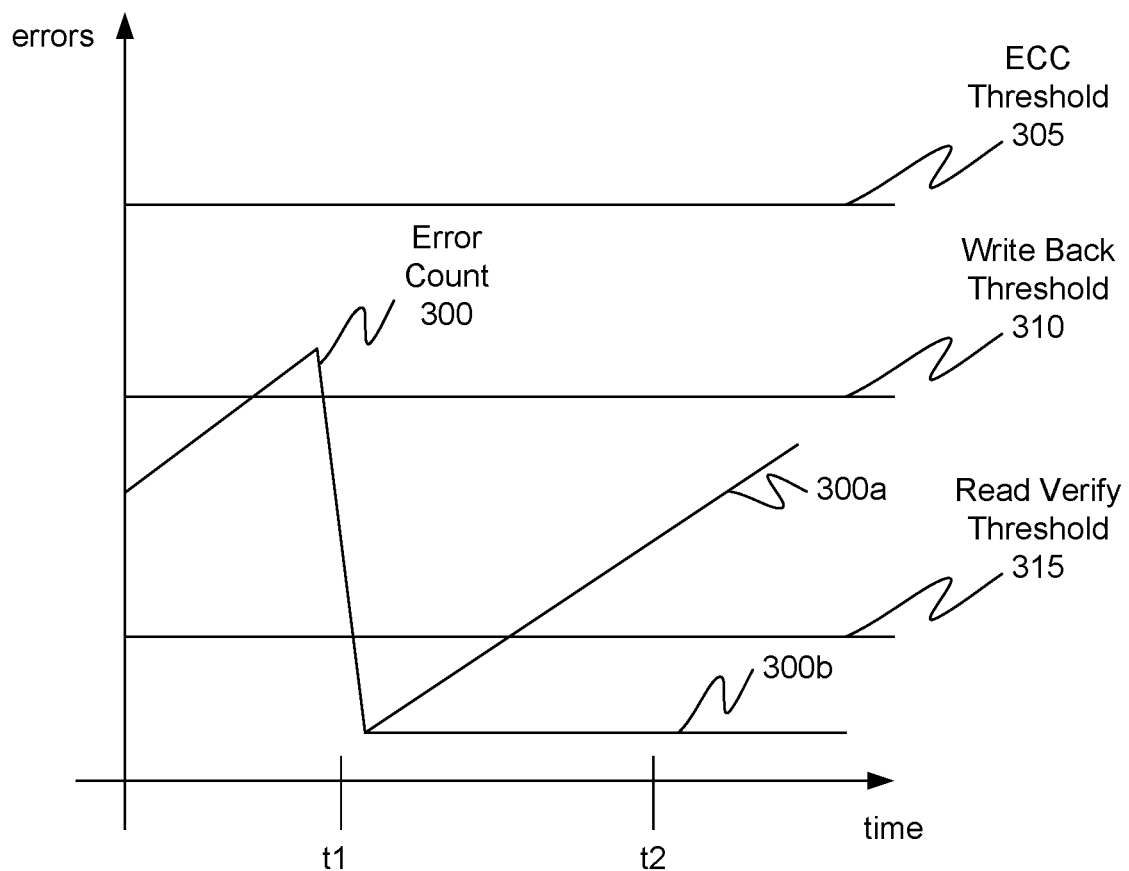
FIG. 3 is a graph illustrating preemptive read verification after hardware write back to a memory device in a memory sub-system in accordance with some embodiments of the present disclosure.

At operation 225, the processing logic determines whether a read verify threshold criterion is satisfied. As illustrated in FIG. 3, an error count 300 can be tracked for a segment (e.g., a management unit or super management unit) of memory device 130. In one embodiment, a write back operations is performed (e.g., prior to operation 205) when the error count 300 satisfies a write back threshold criterion (e.g., meets or exceeds a write back threshold 310 at time t1). As described in more detail below with respect to FIG. 4, the write back operation can cause the error count 300 to drop considerably (e.g., to a zero or near-zero level). After the write-back operation, the read verify operation can be performed at operation 220) and read verify component 113 can determine whether the read verify threshold criterion is satisfied. In one embodiment, read verify component 113 compares the number of errors in the write back data to a read verify threshold 315 (e.g., at time t2). In one embodiment, read verify threshold 315 is lower than write back threshold 310, which itself is lower than an error correction capability (ECC) threshold 305 of the memory device 130. If the number of errors in the write back data meets or exceeds the read verify threshold number 315 (as shown by error count 300a), read verify component 113 can determine that the read verify threshold criterion is satisfied. If the number of errors in the write back data is less than the read verify threshold number 315 (as shown by error count 300b), read verify component 113 can determine that the read verify threshold criterion is not satisfied, that the write back operation was successful, and that the physical memory location can continue to be used in the future.

If the read verify threshold criterion is satisfied, at operation 230, the processing logic initiates a remapping of the management unit to a different physical location on the memory device 130. The physical location where the management unit was stored is retired and not used to store data in the future. The processing logic can then wait for a subsequent notification at operation 235 before returning to operation 205. If the read verify threshold criterion is not satisfied, the processing logic can maintain the management unit at a current location on the memory device 130 (i.e., a location where the data from the management unit was written during the write back operation).

Figure 4:
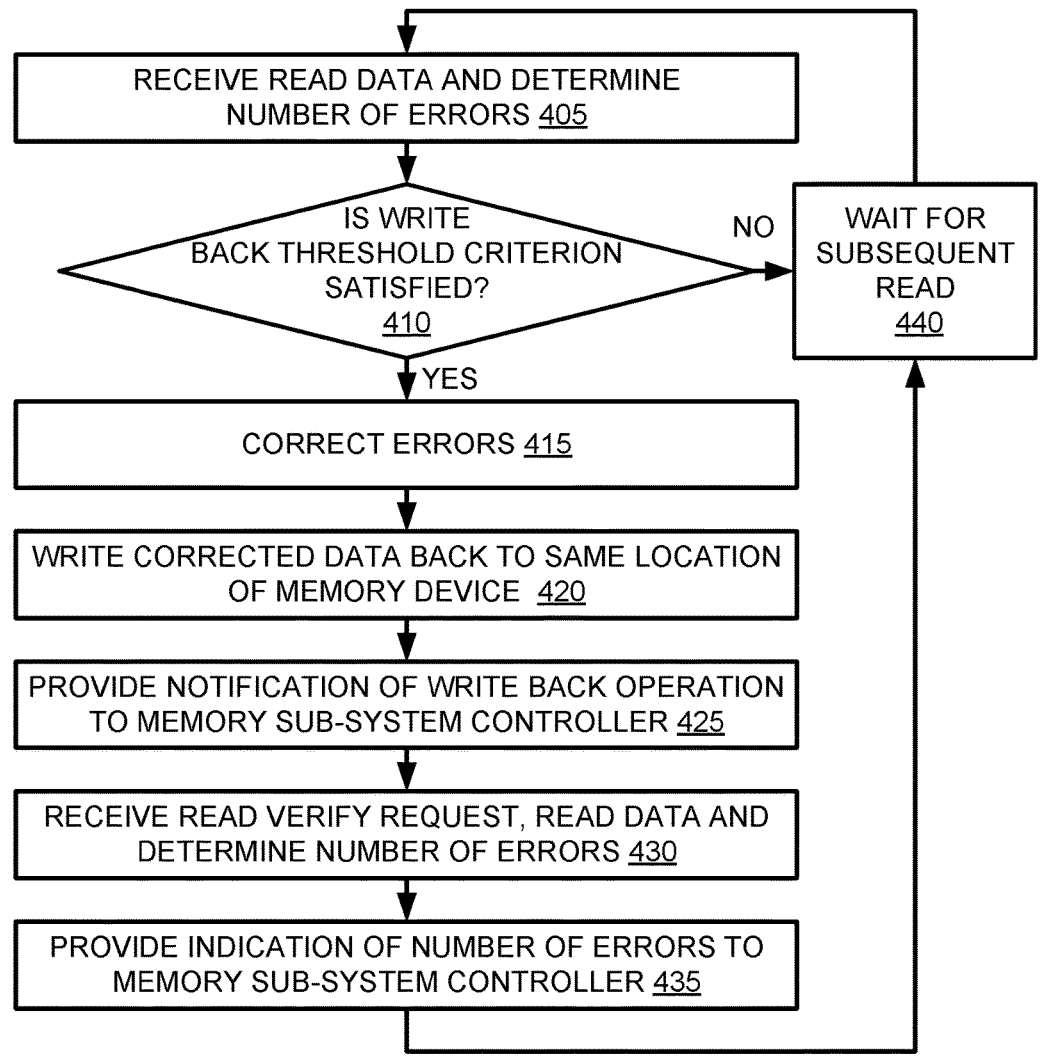
FIG. 4 is a flow diagram of an example method of performing a write back to a memory device in a memory sub-system in accordance with some embodiments of the present disclosure.

FIG. 4 is a flow diagram of an example method of performing a write back to a memory device in a memory sub-system. in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by write back component 137 and local media controller 135 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing logic receives data (e.g., a management unit or super management unit) read from a memory array of memory device 130 and determines a number of errors in the data. In one embodiment, the errors include bit flip errors where data stored as a logic "1" is read as a logic "0" or vice versa.

At operation 410, the processing logic determines whether a write back threshold criterion is satisfied. In one embodiment, write back component 137 compares the number of errors in the data to a write back threshold number 310, (e.g., at time t1 as illustrated in FIG. 3). If the number of errors in the data meets or exceeds the write back threshold number 310, write back component 137 can determine that the write back threshold criterion is satisfied.

If the write back threshold criterion is satisfied, at operation 415, the processing logic corrects the errors in the data (e.g., using error correction code (ECC) and at operation 420, writes the corrected data back to the same location of the memory device 130. As long as the number of errors in the data are less than the ECC capability of the memory sub-system (e.g. the ECC threshold 305), the errors can be corrected before the data is provided to the requestor. Thus in one embodiment, the write back threshold number 310 is less than the ECC capability of the memory sub-system 110 (e.g., the ECC threshold 305). In an attempt to prevent those same errors from being present when a subsequent memory access operation is performed on the same management unit (or super management unit), write back component 137 can perform a write back operation. In a write back operation, the data from the management unit is overwritten with the corrected data that was just read from the memory device 130. Thus, any errors that were present in the data when it was read will be corrected so that those errors are not present going forward. As illustrated in FIG. 3, the error count 300 can drop in response to the write back operation being performed at time t1. Upon performing the write back operation, at operation 425, the processing logic provides a notification of the write back operation to the memory sub-system controller 115.

At operation 430, the processing logic receives a read verify request, reads the associated data, and determines a number of errors in the data. In one embodiment, the program verify component 113 of memory sub-system controller 115 initiates a read of the write back data by sending the read verify request to write back component 137. In one embodiment, write back component 137 performs the read and determines a number of errors in the write back data read from the management unit of the memory device 130.

At operation 435, the processing logic notifies the memory sub-system controller 115 of the number of errors. In one embodiment, the write back component 137 provides an indication of the number of errors in the write back data to read verify component 113. As described above, the read verify component 113 can determine whether the number of errors satisfies a read verify threshold criterion (e.g., meets or exceeds a read verify threshold number 315), and if so, initiate a remapping of the management unit to a different physical location on the memory device 130. At operation 440, the processing logic waits to receive a subsequent read request before returning to operation 405.

Figure 5:
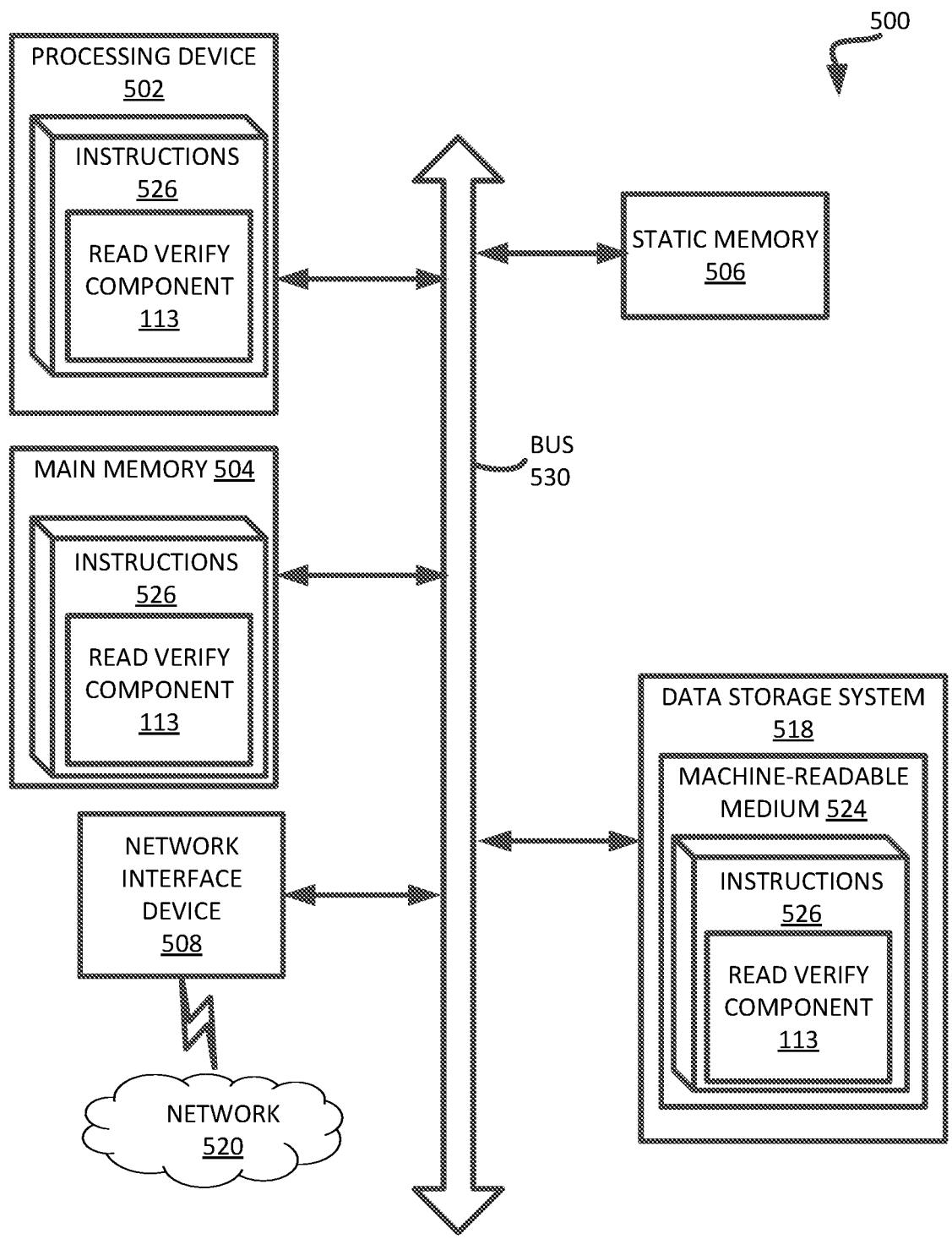
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to read verify component 113, memory sub-system controller 115, or local media controller 135 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to read verify component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving, at a memory sub-system controller and from a non-volatile memory device, an indication that a hardware component on the memory device performed a write back operation for a management unit in the non-volatile memory device;
responsive to receiving the indication that the write back operation was performed, initiating, by the memory sub-system controller, a read verify operation to be performed by the hardware component on the non-volatile memory device for the management unit;
receiving, at the memory sub-system controller and from the non-volatile memory device, an indication of a number of write back errors associated with the management unit during the read verify operation;
determining, by the memory sub-system controller, whether the number of write back errors satisfies a read verify threshold criterion; and
responsive to the number of write back errors satisfying the read verify threshold criterion, remapping, by the memory sub-system controller, the management unit to a different location on the non-volatile memory device.

2. The method of claim 1, wherein:
the hardware component comprises a write back component on the non-volatile memory device, wherein the write back component is to determine a number of read errors associated with the management unit and is to perform the write back operation responsive to the number of read errors satisfying a write back threshold criterion.

3. The method of claim 2, wherein the write back threshold criterion is satisfied when the number of read errors meets or exceeds a write back threshold number.

4. The method of claim 3, wherein the read verify threshold criterion is satisfied when the number of write back errors meets or exceeds a read verify threshold number, wherein the read verify threshold number is less than the write back threshold number.

5. The method of claim 1, further comprising:
   determining whether a read verify operation is pending for the management unit; and
   responsive to a read verify operation not being pending for the management unit, scheduling the read verify operation for the management unit.

6. The method of claim 4, wherein scheduling the read verify operation comprises adding an indication of the management unit to a queue of pending read verify operations.

7. The method of claim 5, wherein the queue of pending read verify operations comprises a fixed number of indications of corresponding management units having read verify operations most recently scheduled.

8. The method of claim 5, wherein the queue of pending read verify operations comprises a number of indications of corresponding management units having pending read verify operations scheduled within a threshold period of time.

9. The method of claim 1, further comprising:
   responsive to the number of write back errors not satisfying the read verify threshold criterion, maintaining the management unit at a current location on the non-volatile memory device.

10. A system comprising:
    a non-volatile memory device; and
    a processing device, operatively coupled with the non-volatile memory device, to perform operations comprising:
      receiving, from the non-volatile memory device, an indication that a hardware component on the memory device performed a write back operation for a management unit in the non-volatile memory device;
      responsive to receiving the indication that the write back operation was performed, initiating a read verify operation to be performed by the hardware component on the non-volatile memory device for the management unit;
      receiving, from the non-volatile memory device, an indication of a number of write back errors associated with the management unit during the read verify operation;
      determining whether the number of write back errors satisfies a read verify threshold criterion; and
      responsive to the number of write back errors satisfying the read verify threshold criterion, remapping the management unit to a different location on the non-volatile memory device.

11. The system of claim 10, wherein:
    the hardware component comprises a write back component on the non-volatile memory device, wherein the write back component is to determine a number of read errors associated with the management unit and is to perform the write back operation responsive to the number of read errors satisfying a write back threshold criterion.

12. The system of claim 11, wherein the write back threshold criterion is satisfied when the number of read errors meets or exceeds a write back threshold number.

13. The system of claim 12, wherein the read verify threshold criterion is satisfied when the number of write back errors meets or exceeds a read verify threshold number, wherein the read verify threshold number is less than the write back threshold number.

14. The system of claim 10, wherein the processing device is to perform operations further comprising:
    determining whether a read verify operation is pending for the management unit; and
    responsive to a read verify operation not being pending for the management unit, scheduling the read verify operation for the management unit.

15. The system of claim 14, wherein scheduling the read verify operation comprises adding an indication of the management unit to a queue of pending read verify operations.

16. The system of claim 15, wherein the queue of pending read verify operations comprises a fixed number of indications of corresponding management units having read verify operations most recently scheduled.

17. The system of claim 15, wherein the queue of pending read verify operations comprises a number of indications of corresponding management units having pending read verify operations scheduled within a threshold period of time.

18. The system of claim 10, wherein the processing device is to perform operations further comprising:
    responsive to the number of write back errors not satisfying the read verify threshold criterion, maintaining the management unit at a current location on the non-volatile memory device.

19. A non-transitory computer-readable storage medium storing instructions, which when executed by a processing device, cause the processing device to perform operations comprising:
    receiving, at a memory sub-system controller and from a non-volatile memory device, an indication that a hardware component on the memory device performed a write back operation for a management unit in the non-volatile memory device;
    responsive to receiving the indication that the write back operation was performed, initiating, by the memory sub-system controller, a read verify operation to be performed by the hardware component on the non-volatile memory device for the management unit;
    receiving, at the memory sub-system controller and from the non-volatile memory device, an indication of a number of write back errors associated with the management unit during the read verify operation;
    determining, by the memory sub-system controller, whether the number of write back errors satisfies a read verify threshold criterion; and
    responsive to the number of write back errors satisfying the read verify threshold criterion, remapping, by the memory sub-system controller, the management unit to a different location on the non-volatile memory device.

20. The non-transitory computer-readable storage medium of claim 19, wherein:
    the hardware component comprises a write back component on the non-volatile memory device, wherein the write back component is to determine a number of read errors associated with the management unit and is to perform the write back operation responsive to the number of read errors satisfying a write back threshold criterion.

* * * * *